July 23, 1968 MAKOTO OKUDA 3,393,866
CALCULATING MACHINE
Original Filed March 29, 1965

Inventor
Makoto Okuda
By Nathan N. Kraus
Frank H. Marlow
Attorneys

July 23, 1968

MAKOTO OKUDA 3,393,866

CALCULATING MACHINE

Original Filed March 29, 1965

Inventor
Makoto Okuda
By Nathan N. Kraus
Frank H. Marks
Attorneys

July 23, 1968  MAKOTO OKUDA  3,393,866
CALCULATING MACHINE
Original Filed March 29, 1965  12 Sheets-Sheet 3

Inventor
Makato Okuda
By Nathan N. Kraus
Frank H. Marks
Attorneys

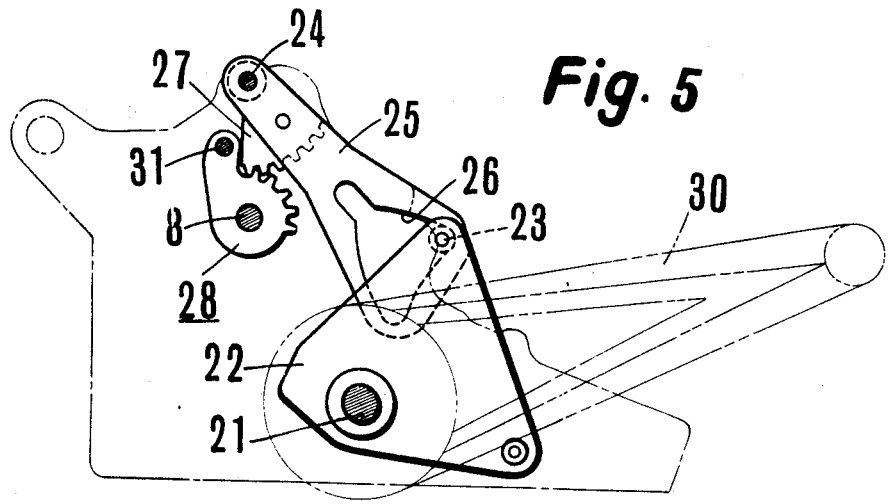
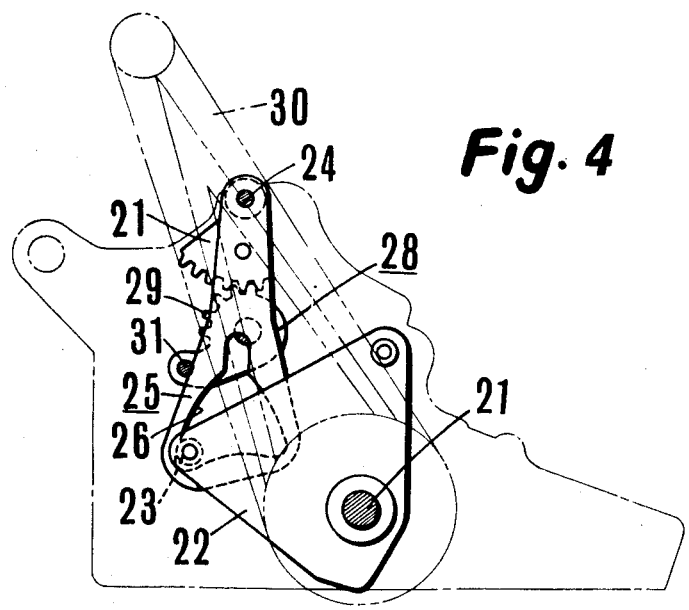

July 23, 1968  MAKOTO OKUDA  3,393,866
CALCULATING MACHINE

Original Filed March 29, 1965  12 Sheets-Sheet 6

Inventor
Makoto Okuda
By Nathan N. Kraus
Frank H. Marks
Attorneys

Inventor
Makoto Okuda

July 23, 1968  MAKOTO OKUDA  3,393,866
CALCULATING MACHINE
Original Filed March 29, 1965  12 Sheets-Sheet 8

Inventor
Makoto Okuda
By Nathan N. Kraus
Frank H. Marks
Attorneys

July 23, 1968  MAKOTO OKUDA  3,393,866
CALCULATING MACHINE

Original Filed March 29, 1965  12 Sheets-Sheet 11

Inventor
Makoto Okuda
By Nathan N. Kraus
Frank H. Marks
Attorneys

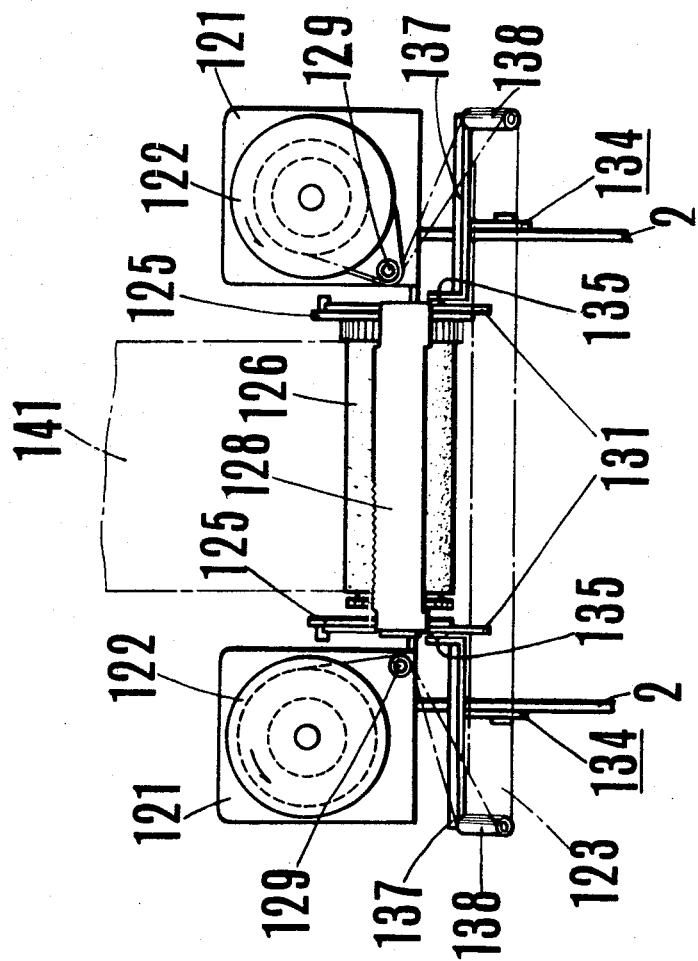

United States Patent Office 3,393,866
Patented July 23, 1968

3,393,866
CALCULATING MACHINE
Makoto Okuda, Osaka, Japan, assignor to Maruzen
Sewing Machine Co. Ltd., Osaka, Japan
Original application Mar. 29, 1965, Ser. No. 443,564, now
Patent No. 3,321,133, dated May 23, 1967. Divided and
this application Feb. 13, 1967, Ser. No. 623,486
3 Claims. (Cl. 235—60.19)

ABSTRACT OF THE DISCLOSURE

A calculating machine having a subtracting mechanism, a depressible key to condition the mechanism for a subtracting operation, a plurality of type elements, a platen assembly having abutments and adapted to be moved into pressing relation with the type elements, and a pair of pivot arms supporting a two-colored ribbon in extended condition with the upper ribbon portion being normally in registration with the type elements. Each arm is connected to a crank through a lever provided with an extension which is normally out of the path of movement of a respective abutment. When the key is depressed the cranks are rocked to move the levers so that the extensions are engaged by the abutments which effects rocking of the arms to shift the ribbon so that the lower portion thereof is moved into registration with the type elements for printing.

---

This is a division of application S.N. 443,564 filed Mar. 29, 1965, now Patent No. 3,321,133.

This invention relates to a calculating machine.

One of the objects of this invention is the provision in a calculating machine of subtracting means wherein by simply depressing the subtracting key the frame carrying the accumulator and subtracting pinions in symmetrical disposition is caused to be revolved so as to effect engagement of the subtracting pinions with the actuator segments and thereby effect a subtracting operation with a high degree of reliability and accuracy.

Another object of this invention is the provision in a calculating machine having subtracting and repeating mechanisms operated by respective keys, of means for re-setting the subtracting mechanism and the operating key thereof after a single cycle of operation, thereby to avoid the possibility of error in continuing undesired subtraction in subsequent cycles of operations, said re-set means, however, being rendered ineffective upon actuation of the repeating mechanism simultaneously with the subtracting mechanism so that repeated subtraction may be carried out in subsequent cycles of operation if desired.

A further object of this invention is the provision in a calculating machine of an inking ribbon having two different colors and means for shifting said ribbon so as to print characters of different colors depending upon whether an adding or subtracting operation has been effected in the machine.

Other novel features of construction and operation of this invention will be more clearly apparent during the course of the following description, reference being had to the accompanying drawings in which have been illustrated the preferred embodiment of the invention and wherein like characters are employed to denote like parts throughout the several figures.

In the drawings,

FIG. 4 is a fragmentary side elevational view, looking toward the left, of the drive mechanism of the calculating machine.

FIG. 5 is a similar view showing the parts in a different operative relationship.

FIG. 19 is a plan view of the mechanism illustrated in FIGS. 17 and 18.

Figure 1:
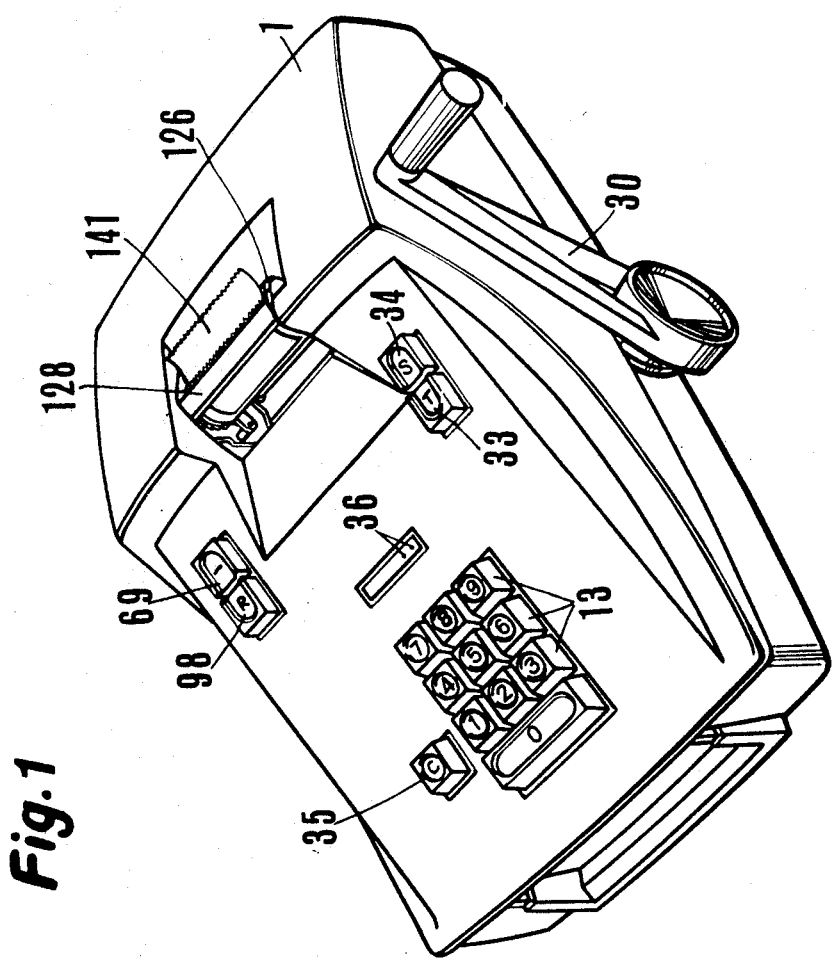
FIG. 1 is a perspective view of a calculating machine in accordance with the present invention.
Figure 2:
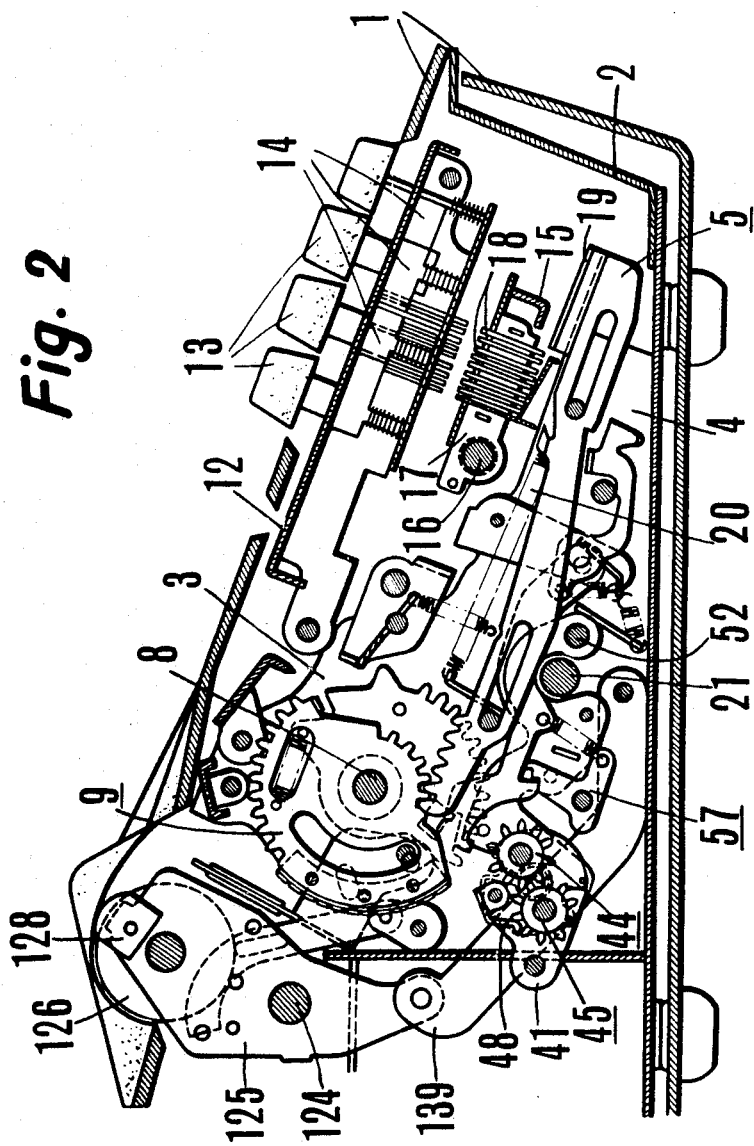
FIG. 2 is a side elevational view looking toward the left of the calculating machine with certain frame parts eliminated in the interest of greater clarity.

Referring to the drawings the numeral 1 indicates a housing containing a frame 2 supporting the machine, indicated generally by the numeral 3. The machine 3 comprises a pair of right and left hand frame plates 4, 4 between which are disposed a plurality of actuator racks 5, each rack being provided with a forward and rearward slot 7, 7 and being mounted for longitudinal travel on a pair of rods 6, 6 which pass through the slots 7, 7. The actuator racks 5 are adapted to move rearwardly or forwardly, the left hand side of the machine as viewed in FIG. 2 constituting the rearward end and the right hand side of the machine, as viewed in said figure constituting the forward end of the machine. A shaft 8 is fixedly secured in the frame plates 4 and rotatably supported on said shaft are a plurality of type sectors 9 having segmental pinions 10 engageable with the teeth of the actuator racks 5.

Arranged on the keyboard 12 fixed on the frame 2 are ten numeral keys 13 ranging from zero to nine, each having a stem 14 guided for vertical movement. The stems 14 are in alignment with and their lower ends normally lie above a row of stop pins 18 which are mounted in the usual manner in a pin carriage 17 which is transversely reciprocal being carried on a pair of rails 15 and 16 supported in the frame plates 2.

Figure 3:
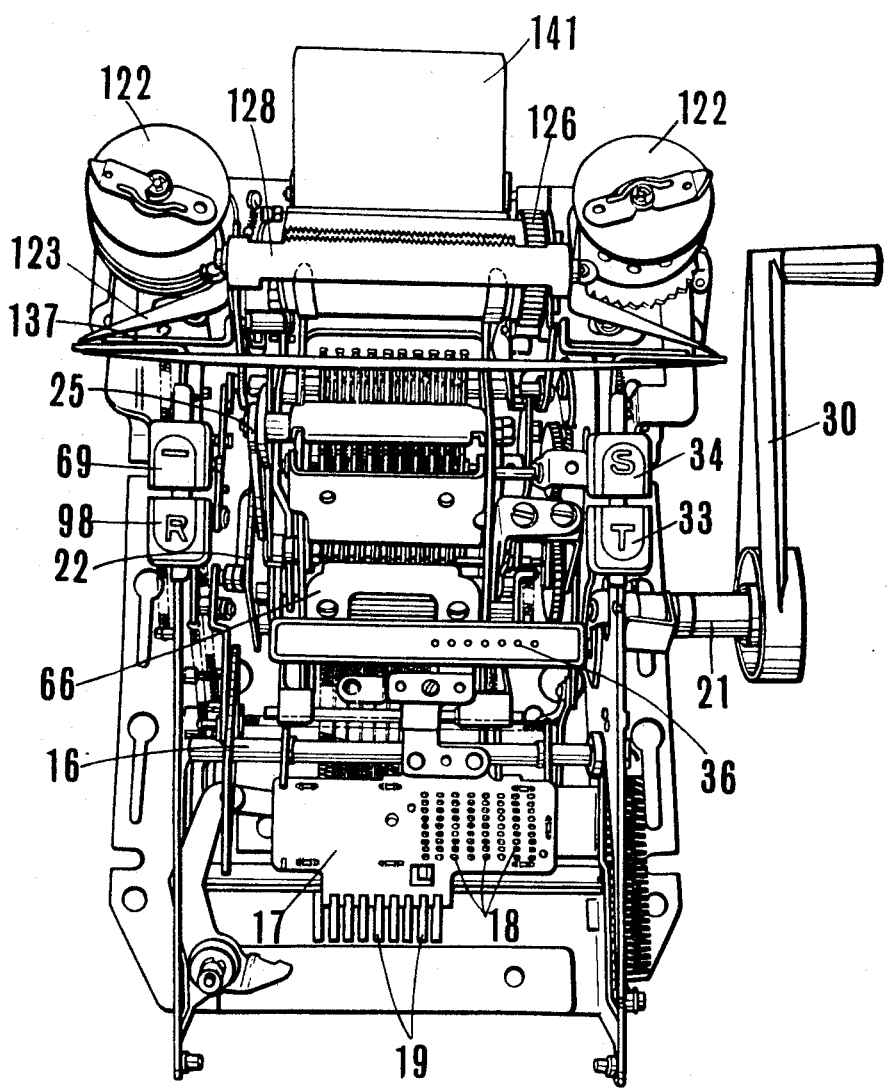
FIG. 3 is a top plan view of the calculating machine illustrated in FIG. 1 with the housing removed.

When a key 13 is depressed the stem 14 depresses a corresponding pin 18 so that the lower end thereof is in a position to be engaged by a stop shoulder 19 on actuator rack 5. Upon release of key 13 the key is urged to its original position by a spring and correspondingly the pin carriage 17 is caused to move transversely one position to the left, as viewed in FIG. 3, along the guide members 15 and 16. The indicating plate 36 which is secured to the pin carriage 17 moves with and indicates its position. A spring 20 secured at one end to the machine frame and at the other end to actuate rack 5 biases the rack 5 in a rearward direction.

A first rocker plate 22, fixed on main operating shaft 21 which is journalled in the machine frame plates 4, 4 is provided with a roller 23 which cooperates with the inwardly facing edges of aperture 26 in arm 25 fixed on shaft 24 journalled in the frame plates 2, 2. A segmental gear 27 is fixed to arm 25 and is adapted to cooperate with a segmental pinion 29 formed on arm 28 pivoted on transverse shaft 8.

When the operating handle 30 is rocked in a forward direction the rocker plate 22 is caused to rock clockwise, as viewed in FIG. 4, causing roller 23 to rock arm 25 to the position illustrated in FIG. 5, thereby rocking the segmental pinion 29 in a clockwise direction, as viewed in FIG. 5.

A restoring bail 31 is secured at one end to arm 28 of the segmental pinion 29 and at the other end to an arm which is correspondingly mounted on shaft 8. The bail 31 extends through arcuate slots 32 formed in all the type sectors 9.

In the arrangement as above described, when one of keys 13 is depressed, the pin carriage 17 is caused to index one position and the corresponding pin 18 is caused to be extended downwardly. Rocking of the handle 30 from the position illustrated in FIG. 4 to the position illustrated in FIG. 5 effects movement of the bail rod 31 in a clockwise direction as viewed in FIG. 5 to its uppermost position to permit the type sectors 9 to rotate in a corresponding clockwise direction by reason of the spring 20 acting on the rack 5 through gear rack 11 and segmental pinion 10 until the stop 19 engages the depressed pin 18.

As the handle 30 moves rearwardly in its operating stroke the bail rod 31 is caused to be returned to its original position and simultaneously acts on each of the type sectors 9 to restore the same to their original positions. It will be understood that the angle of rotation of each type sector 9 corresponds to the value set up in a depressed numeral key 13. The type sectors 9 are in mesh with accumulator pinions 44 and the degree of rotation of each type sector is transferred to the accumulator pinions. The pin carriage 17 is operatively connected to the main shaft 21 operated by the handle 30 so that in the rearward end of the operating stroke of the handle the pins are caused to pass over camming means which return the pins to their non-operative positions.

Figure 9:
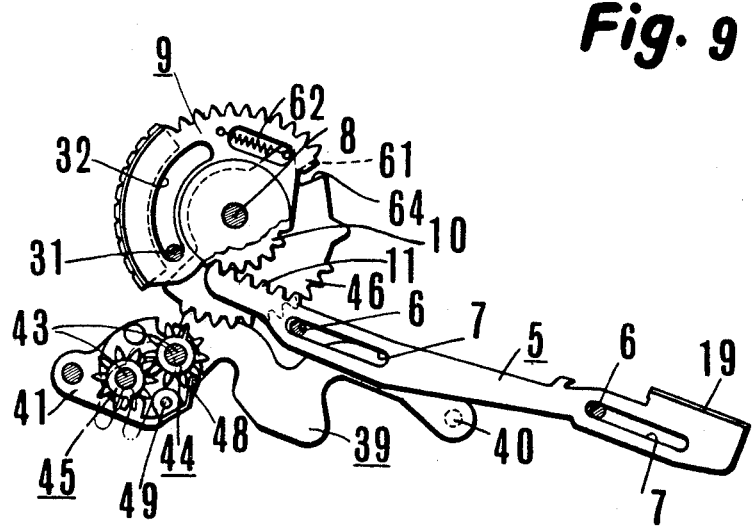
FIG. 9 is a fragmentary side elevational view, illustrating the relationship between the type sectors and the accumulator and subtracting pinions of the calculating machine.

Referring to FIG. 9, a pair of arms 39, 39 are provided, each being pivotally secured at its forward end to a corresponding frame plate 4 by a pivot pin 40. The accumulator assembly consists of a plurality of accumulator pinions 44 adapted to mesh with the gear sectors 46 associated with the type sectors but always being in mesh with subtracting pinions 45. The accumulator pinions 44 are rotatably mounted upon a shaft 43 while the subtracting pinions 45 are similarly carried by another shaft 43. Said shafts 43 together with a pair of end plates 41 and aligner comb strip 48 form an assembly which is rotatable about the axis of aligned pins 42 which secure the accumulator assembly to the arms 39. In normal non-operative position the accumulator assembly assumes the position illustrated in FIG. 9 where the accumulator pinions 44 are in spaced non-operative relation to the gear sectors 46. When the handle 30 is drawn in a forwardly direction this same non-operative relationship obtains. However, in the rearward end of the operating stroke of the handle 30 the arms 39 are rocked about the axis of pin 40 so as to effect engagement of the accumulator pinions 44 with respective gear sectors 46. The accumulator pinions 44 when in normal position as illustrated in FIG. 9 are held from accidental rotation by the comb strip 48 which is pivotally supported on the accumulator frame and biased in a direction to engage the pinions 44. Each of the accumulator pinions 44 as well as the subtracting pinions 45 is formed integral with a hub 53 having a transfer cam tooth 47.

A plurality of transfer pawls 51 (FIG. 9) are pivoted on rod 52 supported in the frame plates 4, 4. At the rearward end of each transfer pawl 51 there is a projection 50 adapted to engage with its associated transfer cam tooth 47. Each transfer pawl 51 includes a notch 55 and a stop projection 54 for engagement with a lug 63 extending laterally of the gear sector 46. A latch 57 one for each transfer pawl is pivotally supported on rod 59 and a spring 60 connected between the two, biases both parts for counter-clockwise rotation as viewed in FIG. 6. The pawl 51 is provided with a downward projection 56 which engages against a notch 58 in the latch 57 and is maintained in such engagement by the spring 60.

Figure 7:
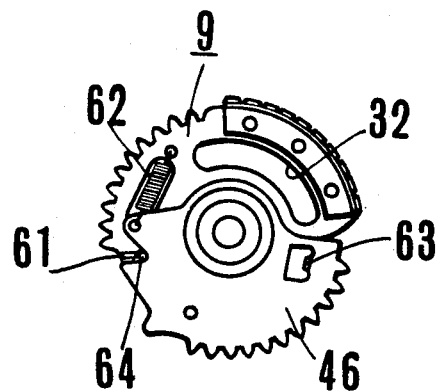
FIG. 7 is a side elevational view of a type sector used in the calculating machine.
Figure 8:
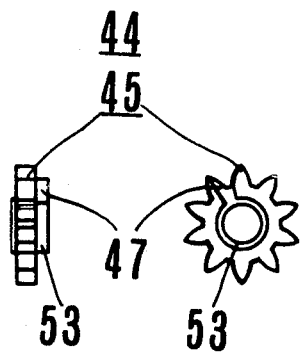
FIG. 8 are end and side elevational views, on an enlarged scale, of the subtracting pinions.

As illustrated in FIG. 7, each gear sector 46 is disposed adjacent to and coaxial with a respective type sector 9 which is provided with a lateral projection 61 adapted to engage shoulder 64 and the parts are maintained in the relationship illustrated by reason of the spring 62 drawing the parts together. In a situation where no numeral key 13 has as yet been depressed, the stop projection 54 of the transfer pawl 51 is maintained in contact with lug 63 against the tension of spring 62 so that the projection 61 is separated from the shoulder 64, as illustrated in FIG. 9.

Figure 6:
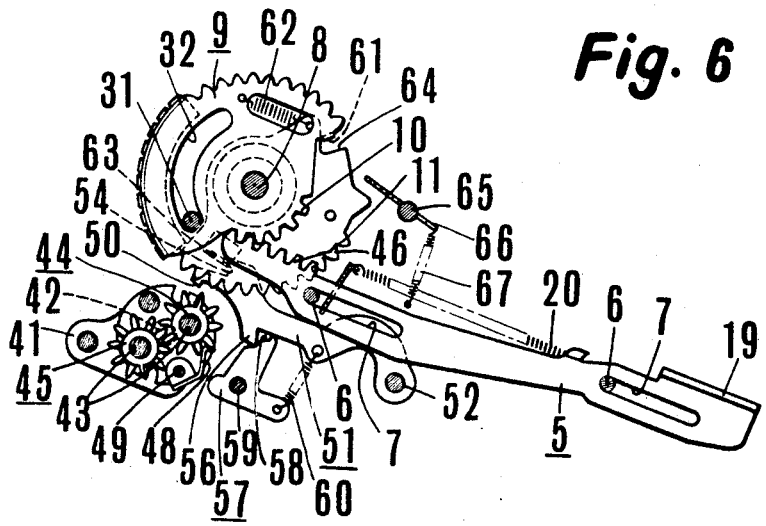
FIG. 6 is a fragmentary side elevational view, partly in section, illustrating certain structural details of the calculating machine.

A plate 66 is pivotally supported on shaft 65 and is biased in a clockwise direction by spring 67, as viewed in FIG. 6. When handle 30 is swung forwardly, plate 66 engages a projection on each of the gear sectors 46 which has been operated to effect the transfer and rotates it clockwise sufficiently to withdraw its lug 63 from the notch 55 of the transfer pawl so that the latter may be swung back to its normal position by its spring 60.

Figure 10:
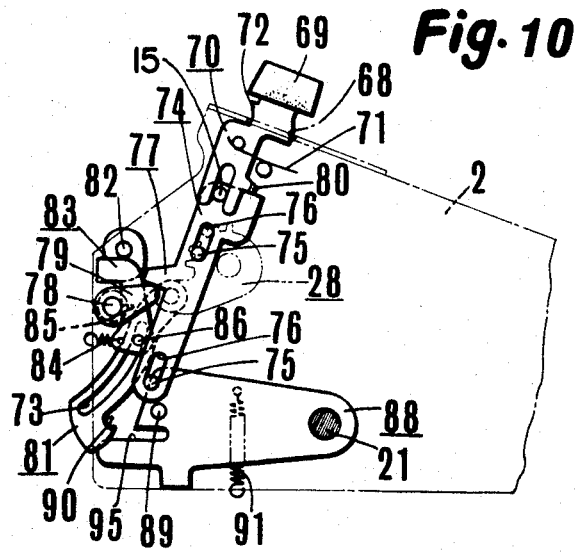
FIG. 10 is a fragmentary elevational view looking toward the left, illustrating the subtracting key and the related mechanism.
Figure 12:
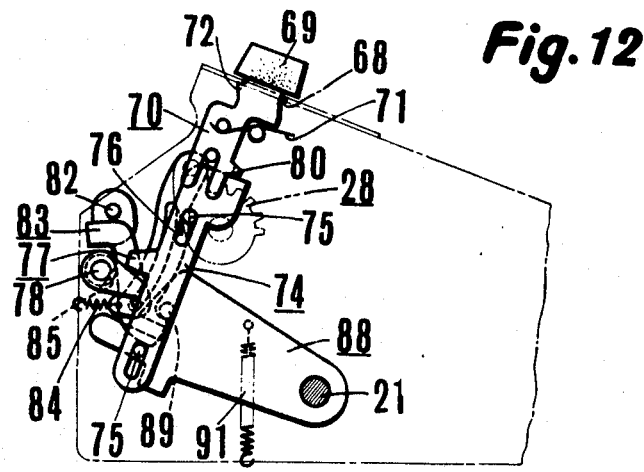
FIG. 12 is a view similar to FIG. 10 and illustrating the parts in a different operative relationship.

Referring to FIG. 10, a subtracting key 69 is mounted on a stem 70 which passes through a slot 68 in a place secured to the frame 2. The stem 70 is biased in an upwardly direction by a spring 71 and is provided with a shoulder 72 adapted to cooperate with a marginal edge of the slot 68 which serves to retain the key 69 in a depressed position. The lower end of the stem 70 is bifurcated to receive a guide pin 15 therebetween and is also provided with a forwardly directed projection 80. As will be apparent, the key 69 may be moved vertically and correspondingly rocked in a limited arc to effect engagement or disengagement of the notch 72 with the marginal edge of the slot 68. A slide bar 74 shaped substantially as illustrated in FIG. 10 includes a forward projection adapted to be engaged by the projection 80 and is provided with a pair of spaced longitudinally aligned slots 76 through which pass pins 75 anchored in the frame 2. The slide bar 74 is adapted for limited movement within the limits of the length of the slots 75 and is biased in an upwardly direction by a spring not shown. The slide bar 74 includes a rearwardly directed projection 77 which is adapted to engage a cam element 79 fixed on a transverse shaft 78 journalled in the frame plates 4, 4.

Figure 11:
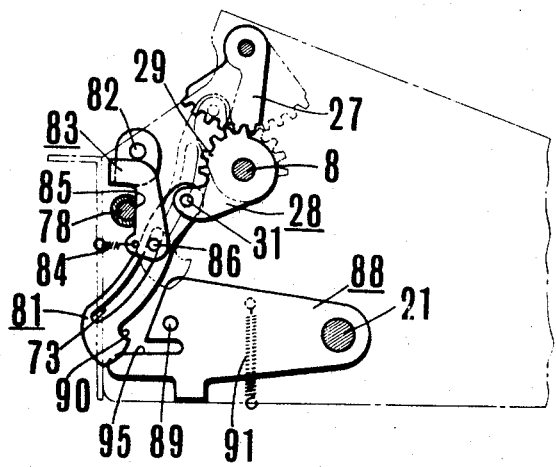
FIG. 11 is a view similar to FIG. 10 with certain parts removed for greater clarity.

Referring to FIG. 11, pivotally secured as by pin 31 to the arm 28 is an operating bar 81 which is shaped substantially as illustrated and is provided with an arcuate slot 73 and a terminal hook portion 90. An arm 83 shaped substantially as illustrated in FIG. 11 is pivotally supported as by a rivet on the frame plate and includes an offset depending portion which is adapted to engage against a flat face portion on the shaft 78 and to be urged into such engagement by a spring 84. A pin 86 carried in the lower end of the depending portion of the member 83 engages in slot 73 of the arm 81. As will be apparent by reference to FIG. 11, rocking of arm 28 in a clockwise direction will effect movement of the arm 81 from the solid line position to the broken line position illustrated in FIG. 11.

Figure 13:
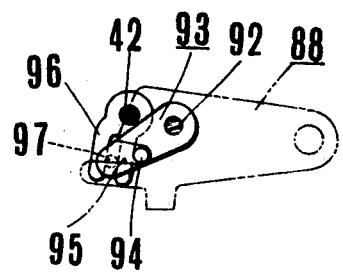
FIG. 13 is a side elevational view of a structural detail, illustrating the mechanism for reversing the accumulating and subtracting pinions to effect a subtracting operation.

Supported for pivotal movement on shaft 21 is a second rocker plate 88 provided with a laterally projecting pin 89 adapted to be engaged by the hook 90. The second rocker plate 88 is also provided with a locking notch 95 opening rearwardly and the plate is normally biased in a counterclockwise direction by spring 91. Referring to FIG. 13, an arm 93 is pivotally supported on a pin 92 anchored in the frame plate 4. Said arm is provided with a laterally extending pin 94 which is adapted to engage in notch 95 of the second rocker plate 88. An arm 96 provided with a forked end is fixed on shaft 42 and is adapted to receive between the forked ends a pin 97 which is carried on arm 93.

In the mechanism above described, when the subtracting key 69 is depressed so as to effect engagement of the shoulder 72 with the marginal edge of slot 68, the slide bar 74 is correspondingly depressed by the projection 80, and projection 77 acting on arm 79 effects rocking a shaft 78 in a clockwise direction as viewed in FIG. 10, so that the arm 83 is cammed to rock in a counter-clockwise direction, as viewed in FIG. 11, whereby the position of pin 86 in slot 73 is shifted to effect rocking of the operating bar 81 to a point where the hook 90 is in closer proximity to the pin 89 on second rocker plate 88.

Figure 14:
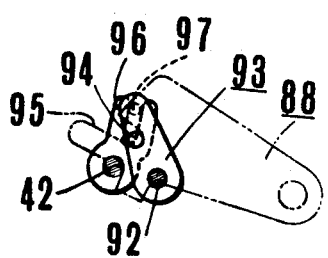
FIG. 14 is a view similar to FIG. 13 but showing the parts in a different operative relationship.

As the handle 30 is rocked in a forward direction arm 28 is caused to rock clockwise causing the operating bar 81 to rock in a counter-clockwise direction whereby the hook 90 engages pin 89 thereby effecting rocking of the rocker plate 88 in a clockwise direction, from the position illustrated in FIG. 13 to the position illustrated in FIG. 14 so that shaft 42 is rotated substantially 180°. The accumulator assembly which is fixed on said shaft is correspondingly rotated to position the subtracting pinions 45 in close proximity to the gear sectors 46 so that when the operating handle 30 is caused to return to its nonoperating position and the accumulator assembly is caused to be moved to effect engagement of the subtracting pinions 45 with the gear sectors 46, said gear sectors will rotate the subtracting pinions and correspondingly the accumulator pinions 44 in a well known manner to effect a subtracting operation.

When the subtracting key 69 is not depressed the parts are in the relationship illustrated in FIG. 10 wherein the arm 83 is in abutment with the flat face 85 of shaft 78 and the operating bar 81 is in its rearmost or retracted position. Accordingly, when the handle 30 is manipulated, even though the operating bar 81 may be caused to move vertically, the hook portion 90 thereof is spaced from the pin 89 so that the second rocker plate 88 is not actuated and rotation of the accumulator assembly is not effected.

It will be understood that the operation of the machine which has not hereinabove been described in detail is conventional and well known in the art.

Figure 15:
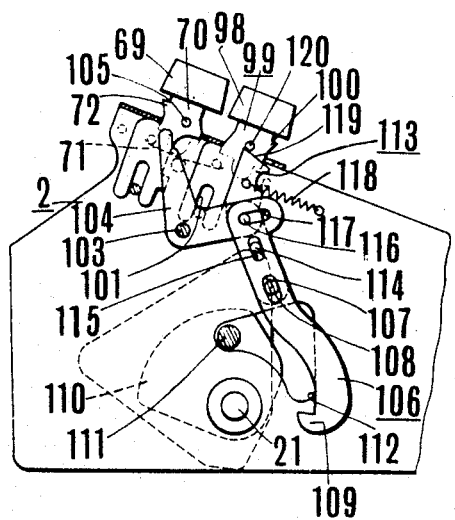
FIG. 15 is a left side elevational view with certain parts removed, illustrating the relationship between the subtracting and repeating keys.
Figure 16:
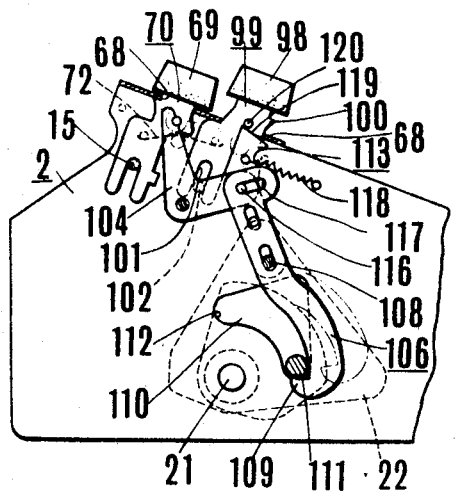
FIG. 16 is a view similar to FIG. 15 but showing the parts in a different operative relationship.

Referring to FIGS. 15 and 16, a repeating key 98 is disposed in alignment and forwardly of the subtracting key 69. The repeating key 98 includes a stem 99 which is normally urged in an upwardly direction by the spring 71. The stem 99 is provided with a projection 100 affording a shoulder for engagement with the forward marginal edge of slot 68 when the key is depressed for retaining said key in depressed condition. The stem 99 is bifurcated at its lower end to provide a slot 101 in which is received a pin 102 fixed in the frame 2 and affording a guide for the vertical movement of the stem 99. A V-shaped lever 104 is pivotally supported on a pin 103 fixed in the frame 2. A pin 105 extending laterally of the key stem 70 is adapted to engage the rearward leg of lever 104 when the subtract key 69 is depressed as illustrated in FIG. 16.

An operating bar 106 shaped substantially as illustrated is provided wih an elongated slot 107 in which is loosely received a pin 108 fixed in frame 2. The operating bar 106 is movable both longitudinally and pivotally relative to pin 108. The lower end of the operating bar 106 is provided with a hook 109, the hook being rearwardly directed.

An operating bar 113 is pivotally supported on pin 108 and carries a laterally projecting pin 114 which is loosely received in an elongated slot 115 in operating bar 106. The operating bar 113 is disposed in spaced parallel relation to the operating bar 106 so as to receive in the space therebetween the forward end of lever 104. As will be noted both operating bars 106 and 113 are simultaneously pivotable about pin 108. However, operating bar 106 in addition is also longitudinally slidable relative to operating bar 113. At its upper end the operating bar 106 is provided with a transversely extending slot 117 in which is loosely received a pin 116 fixed on the forward end of lever 104. A spring 118 connected to studs on the operating bar 113 and the frame 2 normally biases the operating bars 106 and 113 in a clockwise direction as viewed in FIGS. 15 and 16. The uppermost edge of the operating bar 113 is inclined and constitutes a camming surface adapted to be engaged by a stud 120 projecting laterally from the stem 99 of the repeating key when the same is depressed.

A third rocker plate 110 fixed on the main shaft 21 carries a laterally projecting stud 111 which extends outwardly through an aperture 112 in the frame plate 2 so that when the stud 111 is caused to move to the position illustrated in FIG. 16 it engages the hook 109 to draw the operating bar 106 in a downwardly direction.

It will be understood that when neither of the subtracting key 69 nor the repeating key 98 is depressed the machine is in condition to effect a usual adding operation upon depressing any of the numeral keys 13 and operating the handle 30 in the usual manner.

When the subtracting key 69 is depressed, the mechanism is actuated, as hereinabove described, to condition the same for effecting a reversal of the accumulator assembly and effect engagement of the subtracting pinions with the gear sectors 46. Correspondingly, pin 105 on the stem 70 engages the rearward arm of lever 104 and rocks the same in a counterclockwise direction, as viewed in FIG. 16, whereby the operating bar 106 is caused to be moved upwardly longitudinally thereof a short distance from the position illustrated in FIG. 15 to slightly above that illustrated in FIG. 16. When the handle 30 is caused to be moved in a forwardly direction, the subtracting pinions 45 are caused to rotate 180° and effect a subtracting operation in the manner hereinbefore described. In the forward movement of the handle 30 the stud 111 engages the hook 109 of the operating bar 106 and draws the operating bar 106 down in the direction of the original lower position illustrated in FIG. 15. This movement effects rocking of the lever 104 in a clockwise direction causing the rearward end of the lever 104 to act on pin 105 to move the key stem 70 in a forwardly direction so as to effect disengagement of the projection 72 with the marginal edge of the aperture 68 and thereby release the key 69. When the projection 72 clears the slot 68 spring 71 urges the stem 70 and key 69 to nonoperating position. The mechanism for effecting reversal of the accumulator assembly to carry out a subtracting operating position. The mechanism for effecting reversal chine is conditioned for subsequent operations of addition without the requirement for manually manipulating the key 69 to return the same to non-operative position. Thus, the machine is automatically conditioned for subsequent operations of addition.

When it is desired to effect a repeat subtracting operation both keys 69 and 98 are depressed and as will be understood the mechanism controlled by subtracting key 69 will operate, as hereinabove explained. Depressing of repeat key 98 will engage pin 120 with the cam surface 119 of the operating bar 113, thereby effecting rocking of operating bar 113 together with operating bar 106 in a counterclockwise direction as viewed in FIG. 16 so that the hook 109 moves from the solid line position to the dotted line position illustrated in FIG. 16. Accordingly, hook 109 is disposed out of the path of travel of stud 111 so that it can not be engaged thereby and effect return of the subtracting key 69 to non-operative position in the manner hereinabove described. So long as the repeating key 98 is depressed the figures which have been set in the machine by the keys 13 will be recorded for subtraction for every manipulation of the handle 30. When the repeating key 98 is rocked rearwardly to effect disengagement of the shoulder 100 from the marginal edge of slot 68, the key and stem 99 are caused to return to non-operative position by spring 71.

It will be understood that when it is desired to effect a repeating operation of addition, key 98 is repressed and, accordingly, machine mechanism, not shown, is conditioned for effecting repeating operations of addition until key 98 is caused to be returned to non-operative position by manual manipulation.

It will be clear from the foregoing that when a single subtracting operation is required to be carried out, only the subtracting key 69 is depressed and that upon completion of the particular subtracting cycle, the mechanism automatically is reset for an operation of addition thereby precluding the possibility of performing a subsequent subtracting operation in error. However, when it is desired to repeat a subtracting operation through a plurality of cycles, both keys 60 and 98 are depressed simultaneously, so as to render the automatic reset means for key 69 inoperative.

Figure 17:
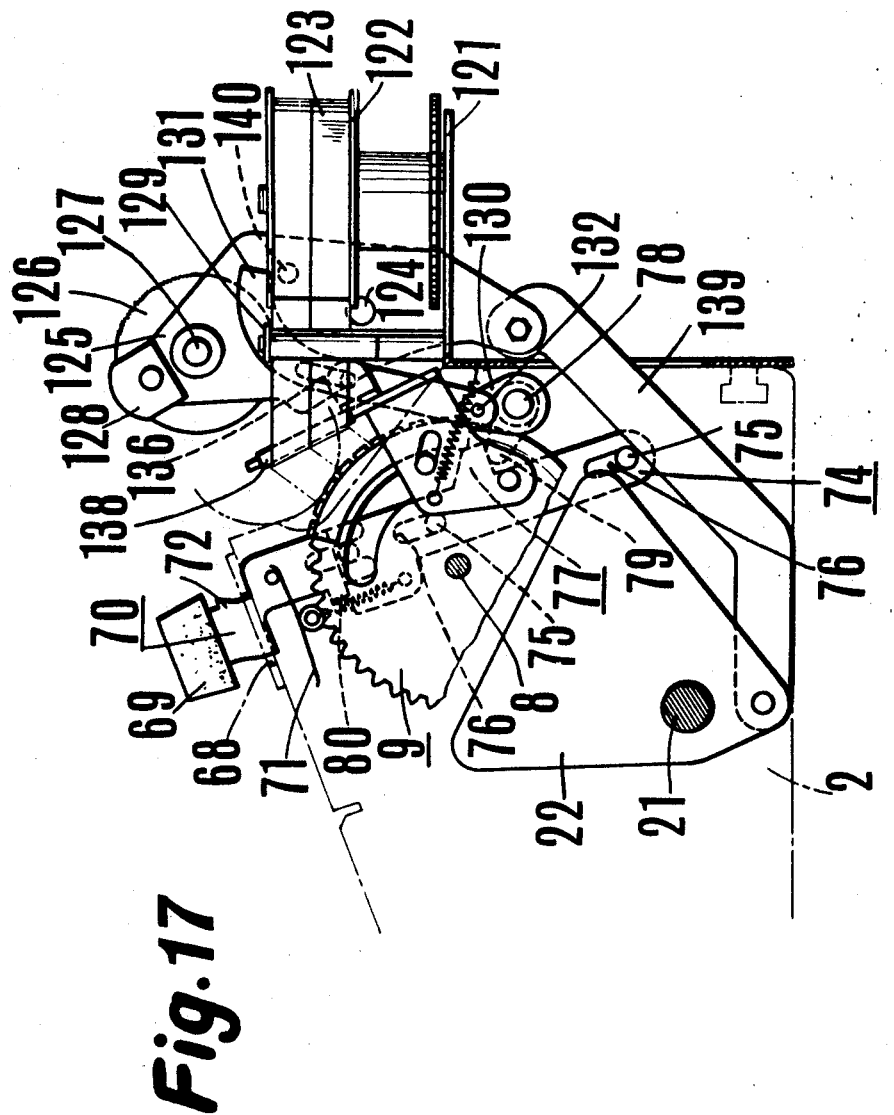
FIG. 17 is a side elevational view looking toward the right, illustrating the subtracting key and the ink ribbon changeover mechanism related to the same.
Figure 18:
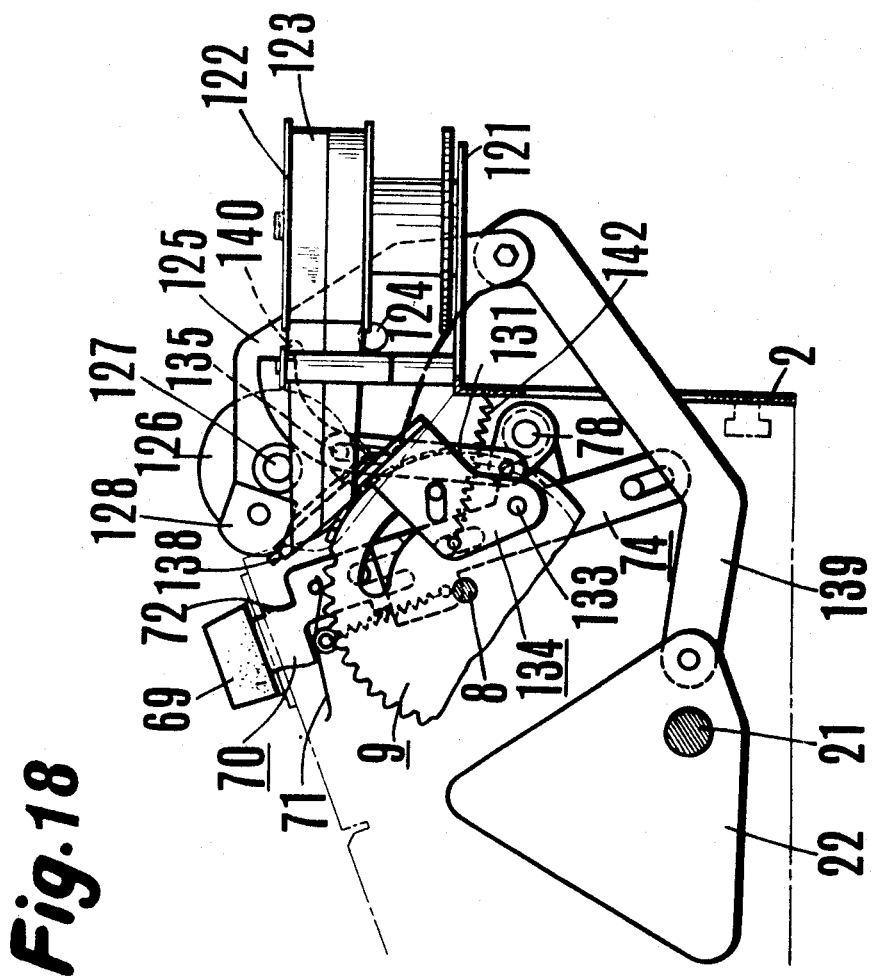
FIG. 18 is a view similar to FIG. 17 but showing the parts in a different operative relationship.

Referring to FIGS. 17–19, a pair of supporting plates 121 are suitably fixed to the rearward end of frame 2 in spaced relation and in a horizontal plane. Each of the plates is adapted to support in horizontal position a ribbon spool 122 on which is wound a two-color ribbon 123, the upper one-half being impregnated with black ink and the lower one-half with red ink. The plates 121 support conventional mechanism for effecting advancement of the ribbon after each printing cycle. It will be understood that one of the spools 122 constitute a supply spool while the other constitutes a take-up spool.

A platen assembly includes a pair of spaced arms 125 in which is journalled a shaft 127 supporting a platen 126. A paper cutting blade 128 is supported on the arms 125 and is arranged in close proximity to the platen 126. The arms 125 are pivotally supported on a shaft 124 secured in suitable rearward extensions of the frame 2.

A pair of vertical guide rollers 129 are carried, one on each of the supporting plates 121, and are disposed inwardly and forwardly of a respective spool 122 as illustrated in FIG. 19. Fixed on each end portion of shaft 78 is a crank arm 130 which is pivotally connected at its distal end to a lever 131, shaped substantially as illustrated, with the upper portion of the lever 131 being in arcuate formation and curving rearwardly, said lever being provided with an elongated slot 136.

A pair of right and left arms 134, shaped substantially as illustrated in FIGS. 17–19, are each pivoted at their lower portions, as at 133 relative to the frame 2. Each arm 134 includes an inwardly directed right angle member carrying on its end a pin 135 which is adapted to be loosely received in slot 136 of lever 131. It will be apparent that as a result of the interengagement of the lever 131 with arm 134 both will be caused to rock simultaneously, the rocking movement being limited to the extent of the length of a slot provided in arm 134 in which is received a pin carried on frame 2. A spring 142 normally biases the arms 134 in a rearward direction. Each of the arms 134 includes an integral outwardly directed portion 137 bent at right angles to the plane of the arm 134 and a guide roller 138 is provided at the end of each extension 137.

A lever 139 is connected at one end to the rocker plate 22 which is fixed on main shaft 21. It will be apparent that as first rocker plate 22 is caused to rock about the axis of shaft 21, as illustrated in FIGS. 17 and 18, the platen assembly will be caused to rock about the axis of shaft 124 from the solid to the broken line positions in FIG. 17. Each arm 125 carries a stud 140 which extends laterally thereof and which is adapted to be engaged by levers 131, as will be hereinafter explained.

In the mechanism as above described, after a numeral key 13 has been depressed, the handle 30 is rocked forwardly in the usual manner to effect rocking of shaft 21 in a counterclockwise direction to effect rocking of the first rocker plate 22 from the position illustrated in FIG. 17 to that illustrated in FIG. 18. Through the medium of link 139 the platen assembly is caused to be rocked from the solid line position to the broken line position illustrated in FIG. 17 wherein the paper tape 141 wrapped around the platen 126 is moved into printing relation with the ribbon 123 extending between the rollers 138 against the type sectors 9 so as to effect a printing operation on the tape. As the handle 30 is returned to its original position the respective parts resume their original relationships while the platen 126 is caused to be rotated by conventional means a distance equivalent to one line to advance the tape correspondingly for a subsequent printing operation.

Referring to FIG. 19, the ribbon 123 is unwound from the supply spool 122 on the right side of the machine and passes over the respective guide roller 129 along its inner side then over the respective outer roller 138 across the type elements of the type sectors 9 to the roller 138 on the left hand side of the machine and over the corresponding guide roller 129 and is wound up on the left hand ribbon spool 122. It will be understood that in the operation as above described the lower one-half portion of the inking ribbon 123 is disposed in a position in registration with the type elements and the platen 126 so that the printing effected is in black ink.

Referring to FIG. 17, when the subtracting key 69 is in its non-operative position, as illustrated, the slide bar 74 is also disposed in its uppermost position so that cam element 79 and crank arm 130 assume the positions illustrated in FIG. 17. Accordingly, lever 131 is in its elevated position with the curved end portion thereof being disposed above stud 140. When the handle 30 is operated the platen assembly is caused to rock in a counterclockwise direction, as viewed in FIG. 17, as hereinbefore explained, with the stud 140 passing under lever 131 and out of engagement therewith. Arm 134 which is connected to lever 131 will maintain the relationship illustrated in FIG. 17 and the black upper portion of ribbon 123 which is spanned between guide rollers 138 will be in a position in relation to the type elements of the type sectors and the platen to print black numerals on the tape 141.

When the subtracting key 69 is depressed shaft 78 is rocked in a counterclockwise direction, as viewed in FIG. 17 by reason of shoulder 77 engaging against arm 79 to draw lever 131 downwardly to the position illustrated in FIG. 18 whereby its distal end is in a position to be engaged by stud 140 when the platen assembly is rocked. Accordingly, when the handle 30 is operated to rotate shaft 21 and first rocker plate 22 the platen assembly through link 139 is caused to rock in a counterclockwise direction to the position illustrated in FIG. 18. As the platen 126 moves in the direction of the type sectors 9 pin 140 will engage against the end of lever 131 and effect rocking of the lever 131 together with the platen assembly to the position illustrated in FIG. 18. In such movement rocker plate 134 is rocked to the position illustrated in FIG. 18 whereby the ribbon 123 spanned between the rollers 138 at the ends of arms 137 will be revolved or shifted in an arc the center of which is the axis of pin 133. This movement positions the lower one-half or red inked portion of the ribbon 123 in registration with the type elements and the platen 126 so that when the platen bears against the type elements the printed figures on tape 141 are in red ink.

It will be apparent from the foregoing that when the subtracting key 69 is not depressed printing of the numerals on the tape 141 for an operation of addition is effected in black ink while when the subtracting key 69 is depressed the ribbon 123 is shifted so as to register with the type elements and effect printing of a subtracting operation in red ink.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. In a calculating machine having a frame and a plurality of rotatable type sectors each including type elements and a gear sector and means for operating each type sector, an accumulator assembly comprising a plurality of accumulator pinions and a plurality of subtracting pinions, means for rotatably supporting said accumulator assembly so as to effect selective engagement of said accumulator pinions or subtracting pinions with respective gear sectors to effect an adding or subtracting operation, a depressible subtracting key and a depressible repeating key arranged in spaced longitudinal alignment on said frame, means for releasably retaining said keys in depressed condition, means responsive to the depressing of said subtracting key to effect rotation of said accumulator assembly so as to effect engagement of said subtracting pinions with said gear sectors thereby to effect an operation of subtraction, means actuable in an operational cycle of said machine to effect automatic release of said depressed subtracting key so as to re-set said accumulator assembly for an operation of addition, means responsive to the depressing of said repeating key to render said last mentioned means ineffective so as to condition the machine mechanism for repeating subtracting operations, a platen assembly adapted to be moved into pressing relation with said type elements, a two-colored ribbon having an upper portion of one color and a lower portion of another color, movable means supporting a portion of said ribbon in extended condition across said type elements with the upper portion of said ribbon normally in registration with said type elements, means operatively connected to said movable means and positioned when said subtracting key is depressed to be engaged by said platen assembly to effect shifting of said ribbon whereby said lower ribbon portion is moved into registration with said type elements for printing.

2. In a calculating machine having subtracting mechanism and a depressible key to condition said mechanism for a subtracting operation, a plurality of aligned type elements and a platen assembly having abutments and adapted to be moved into pressing relation with said type elements, a two-colored ribbon having an upper portion of one color and a lower portion of another color, a pair of pivoted arms supporting a portion of said ribbon in extended condition across said type elements with the upper portion of said ribbon normally in registration with said type elements, spring means biasing said arms in a position so that said upper ribbon portion is in registration with said type elements, a pair of coaxially mounted cranks rigid with each other, a pair of levers each pivoted at its lower end to a respective crank and each operatively connected with a respective arm, each of said levers having a rearwardly directed extension adapted to engage a respective abutment, said extensions being normally out of the path of movement of said abutments, means associated with said key and operable when said key is depressed to rock said cranks whereby to move said levers to positions where said extensions are engaged by said abutments to effect rocking of said arms to shift said ribbon so that the lower portion is moved into registration with said type elements for printing.

3. The invention as defined in claim 2 in which each of the levers has an intermediate elongated slot and each of the arms has a pin received in a respective slot whereby to operatively connect said levers to said arms.

References Cited

UNITED STATES PATENTS

| 1,542,130 | 6/1925 | Hayes | 235—60.19 |
|---|---|---|---|
| 1,875,913 | 9/1932 | Bernau | 235—58 |
| 2,011,310 | 8/1935 | Anderson | 235—60.19 |
| 2,189,851 | 2/1940 | Williams et al. | 235—60 |
| 2,194,270 | 3/1940 | Sundstrand | 235—60 |
| 2,263,479 | 11/1941 | Williams | 235—60.18 |
| 2,318,000 | 5/1943 | Lippert | 197—114 |
| 2,692,556 | 10/1954 | Anderson | 101—336 |
| 3,186,533 | 6/1965 | Schultz | 235—60.19 |

RICHARD B. WILKINSON, *Primary Examiner.*

S. A. WAL, *Assistant Examiner.*